United States Patent [19]

Jacob et al.

[11] Patent Number: 5,376,052
[45] Date of Patent: Dec. 27, 1994

[54] FIXED CONSTANT VELOCITY JOINT

[75] Inventors: Werner Jacob, Frankfurt am Main; Achim Jacob, Kiel-Suchsdorf, both of Germany

[73] Assignee: Löhr & Bromkamp GmbH, Offenbach am Main, Germany

[21] Appl. No.: 32,502

[22] Filed: Mar. 17, 1993

[30] Foreign Application Priority Data

Mar. 19, 1992 [DE] Germany .............................. 4208786

[51] Int. Cl.⁵ ............................................ F16D 3/223
[52] U.S. Cl. ..................................... 464/145; 464/906
[58] Field of Search ............... 464/145, 143, 139, 905, 464/906

[56] References Cited

U.S. PATENT DOCUMENTS

| | | | |
|---|---|---|---|
| 1,847,550 | 3/1932 | Anderson | 464/145 |
| 1,985,278 | 12/1934 | Bradley | 464/145 |
| 3,186,189 | 6/1965 | Cull | 464/145 |
| 4,191,031 | 3/1980 | Girguis et al. | 464/145 |
| 4,608,028 | 8/1986 | Welschof et al. | 464/145 |
| 4,950,206 | 8/1990 | Jacob | 464/145 |
| 4,968,287 | 11/1990 | Jacob | 464/145 |

FOREIGN PATENT DOCUMENTS

| | | | |
|---|---|---|---|
| 785242 | 8/1935 | France . | |
| 2057214 | 3/1973 | Germany . | |
| 3739867 | 8/1990 | Germany . | |
| 3904655 | 8/1990 | Germany . | |
| 1447078 | 8/1976 | United Kingdom | 464/146 |

Primary Examiner—Daniel P. Stodola
Assistant Examiner—Eileen A. Dunn
Attorney, Agent, or Firm—Harness, Dickey & Pierce

[57] ABSTRACT

A fixed constant velocity joint has a hollow outer part (1) whose inner face (2), relative to the longitudinal axis (4) of the outer part, is provided with outer running grooves (3). The cavity (5) of the outer part (1) contains an inner part (6) whose outer face (8) is provided with inner running grooves (7) which extend in meridian planes relative to the longitudinal axis (12) of the inner part and which are positioned opposite the outer running grooves (3). In each case, opposed inner running grooves (7) and outer running grooves (3), jointly, accommodate a ball (9) for torque transmitting purposes. The ball (9) is guided in a cage (11) arranged between the inner face (2) of the outer part (1) and the outer face (8) of the inner part (6). The cage (11), via its partial spherical face (18), is guided on an outer spherical face (14) of the inner part (6) facing away from the closed end (15) of the joint. The inner part (6) is provided with a first guiding face (30) which is designed as a hollow spherical zone, which, starting from the closed end (15), is designed to be undercut-free and whose center is positioned on the joint articulation center (13). Via a guiding element (22) with a second guiding face (29), designed as a spherical cap, the inner part (6) is axially secured as a result of the guiding element (22) resting against the supporting element (20). The guiding element (22) is displaceably supported on the supporting element (20) in the radial direction relative to the longitudinal axis (4) of the outer part.

15 Claims, 3 Drawing Sheets

FIXED CONSTANT VELOCITY JOINT

BACKGROUND OF THE INVENTION

The present invention relates to a fixed constant velocity joint. The joint includes a hollow outer part having an inner face provided with outer running grooves which extend in meridian planes with reference to the longitudinal axis of the outer part. Also, the joint includes an inner part arranged in the cavity of the outer part. The inner part has an outer face provided with inner running grooves which extend in meridian planes with reference to the longitudinal axis of the inner part and which are arranged opposite the outer running grooves. The opposed inner running grooves and outer running grooves jointly receive torque transmitting balls. The balls are guided in windows of a cage arranged in the space between the inner face of the outer part and the outer face of the inner part. The inner running grooves and the outer running grooves are designed to be jaw-like and undercut-free starting from the closed end of the assembled joint. Also, the cage includes a partial spherical face which is guided on an outer spherical face of the inner part which faces away from the closed end. Further, the joint includes a guiding mechanism. The guiding mechanism includes a first spherical guiding face on the inner part and a corresponding second guiding face on a guiding element which is connected to the outer part and supported on a separate supporting element. The centers of the guiding faces, together with the center of the outer spherical face, are centered on the joint articulation center.

Relevant art is shown in DE 37 39 867 C2, issued Mar. 8, 1990 (U.S. Pat. No. 4,950,206, issued Aug. 21, 1990). The outer face of the inner part is designed entirely as a spherical face in order to permit contact with a ball socket. The ball socket is produced as a separate component, e.g. separate from the outer part.

Centering of the cooperating parts in the radial direction, the inner part, cage and outer part, is effected via corresponding spherical faces of the inner part, cage and outer part. The inner part spherical face cooperates with a partial spherical partial face of the cage. The spherical outer face of the cage is guided on a partial spherical face of the outer part. The disadvantage of this design is that two centering operations are adjusted to one another to achieve centering in the radial direction. On the one hand, centering takes place via the outer spherical face of the inner part relative to the separate supporting element and on the other hand via the cooperating spherical faces of the inner part, cage and outer part. The outer spherical face of the inner part extends over more than 180° and therefore requires subsequent machining because accurate production of the outer spherical face by precision forming, to finish dimensions, is achieved by sophisticated equipment at higher costs.

SUMMARY OF THE INVENTION

It is therefore an object of the present invention to provide a fixed constant velocity joint where, as far as guidance of the joint components in the radial direction is concerned, adjustment is not required. Also, both the outer and inner parts are produced entirely by precision forming.

In accordance with the invention, the first guiding face associated with the inner part is designed as a partial spherical face which is undercut-free starting from the closed end of the assembled joint. The second guiding face, associated with the guiding element, forms part of a spherical cap. The centers of the two guiding faces are arranged on the joint articulation center. The supporting element for the outer part is adjustable, for assembly purposes, in the direction of the longitudinal axis of the outer part. The guiding element is axially fixable and radially displaceably supported on the supporting element with reference to the longitudinal axis of the outer part.

An advantage of this design is that the guiding element is able, to freely adjust itself in the radial direction with reference to the longitudinal axis of the outer part. Thus, adjustment with respect to guiding the joint components relative to one another is substantially eliminated. Furthermore, since the supporting element is axially adjustable relative to the outer part, it is possible to adjust the play so that, in the case of coarse production tolerances, it is possible to achieve close play values. This close play leads to an accurate behavior of the joint in the assembled condition. To compensate for any possible offset of the centers, the supporting element in the region of the sliding face, e.g. the contact face for the guiding element, may be resilient in the direction of the longitudinal axis of the outer part.

Such a design may be used with fixed constant velocity joints like those described in DE 37 39 867 C2, in which case centering in the radial direction takes place via the spherical faces of the inner part, cage and outer part.

Alternatively, the design may be used with joints where the cage and inner part are centered relative to the outer part entirely by the balls in the inner and outer running grooves and where play exists between the outer face of the cage and the inner face of the outer part. Such a type of joint is described in DE 39 04 655 C1, issued Feb. 8, 1990 (U.S. Pat. No. 4,968,287, issued Nov. 6, 1990). The cage is held in contact relative to the inner part entirely via the balls. Furthermore, the inner part and the cage are centered relative to the outer part via the balls. As a result, it is possible to obtain a particularly low-friction joint. Thus, due to the joint's radially floating arrangement, the supporting element does not exert compulsory forces on the centering means.

To achieve a low-friction design, in one embodiment of the invention, the first guiding face is designed as a hollow spherical zone. The hollow spherical zone is formed by two parallel planes intersecting the hollow sphere. In order to achieve a particularly advantageous friction behavior and thus low friction losses, the two intersecting planes are arranged on one side on one half of the hollow sphere. As a result, a larger and a smaller face of an imaginary hollow spherical layer is obtained. The spherical portion associated with the larger face and thus with the larger opening of the hollow spherical layer, with reference to the articulation center, comprises an apex angle of less than 166°. With reference to the smaller face and smaller opening of the hollow spherical layer, the associated hollow spherical portion, with reference to the joint articulation center, includes an apex angle of at least 14°.

In a further embodiment of the invention, the guiding element is divided and includes a guiding ball and a guiding support. The guiding support has a contact face to permit support on a sliding face of the supporting element and a seat face for the guiding ball.

An advantage of such a design is that it is possible to select a standard component which is also commonly used in rolling contact bearings and which is available in very fine diameter increases. Such a guiding ball has a surface which otherwise could only be achieved at considerable expense for a single-part supporting element. Thus, friction conditions are also improved by such a design. To further improve easy running of the joint, lubricating channels are provided on the first guiding face. For the same reason, lubricating channels are provided on the contact face of the guiding support and the single-part guiding element.

In a further embodiment, the outer part is formed as a plate metal part, which enables advantageous adjustment of play conditions. Thus, it is possible to use an outer part produced with larger production tolerances in order to ensure close play conditions in the joint.

Furthermore, the supporting element, may be formed as a plate metal part. The support element is received and guided in the cavity of the outer part and includes an outer contour which corresponds to the inner face of the outer part, e.g. projections which engage the outer running grooves. Thus, it is possible to achieve a non-rotating connection between the supporting element and the outer part, which, in turn, enables the supporting element to be used as a connecting part connected to a driving or driven part.

Also the guiding element may be formed as a plate metal part. In this case, the moved masses are reduced.

To produce the supporting element, it is possible to use a solid formed part with a flange portion whose outer contour corresponds to the inner face of the outer part. Also, the part includes a formed-on journal to provide a non-rotating connection with a driving or driven part. Further, the outer part may be provided in the form of a solid formed part.

From the following detailed description taken in conjunction with the accompanying drawings and subjoined claims, other objects and advantages of the present invention will become apparent to those skilled in the art.

BRIEF DESCRIPTION OF THE DRAWINGS

Different embodiments of a fixed constant velocity joint in accordance with the invention are illustrated in the drawings and explained with reference to the drawings wherein.

DETAILED DESCRIPTION OF THE PREFERRED EMBODIMENTS

Figure 1:
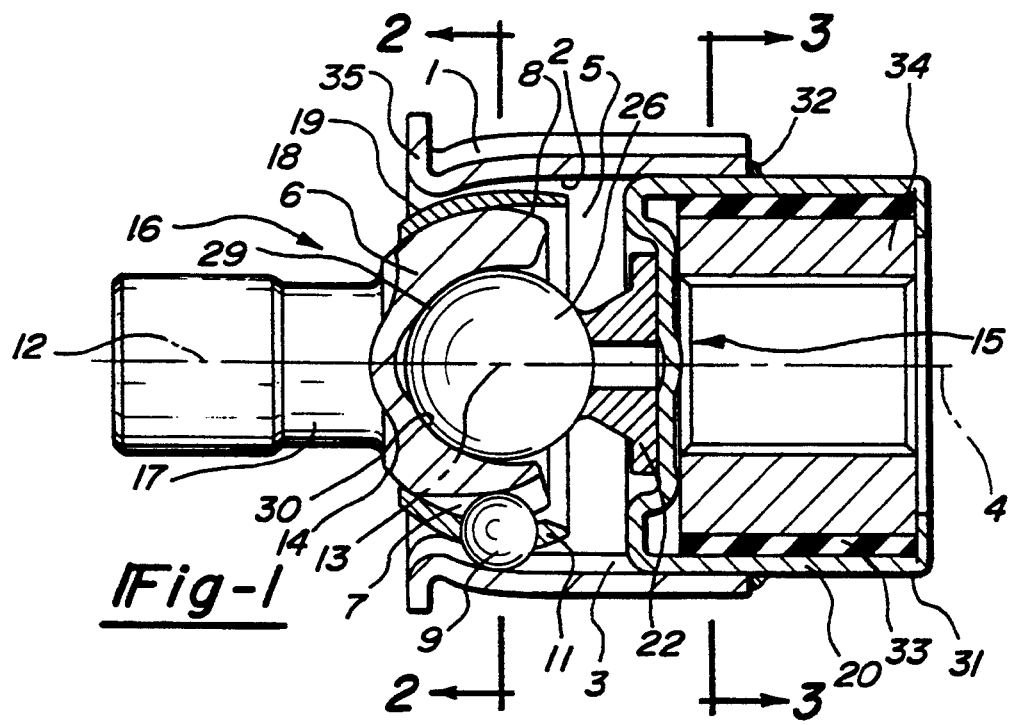
FIG. 1 is a longitudinal section view of a fixed constant velocity joint in accordance with the invention.

A first embodiment of a fixed constant velocity joint in accordance with the invention is illustrated in FIGS. 1 to 4 with the outer part given the reference number 1. The outer part 1 is designed as a hollow formed plate metal part and includes circumferentially distributed formations occurring as a result of the outer running grooves 3 provided in the inner face 2. With reference to the outer part longitudinal axis 4, the outer running grooves 3 are circumferentially distributed in meridian planes.

An inner part 6 is centrically received in the hollow interior 5 of the outer part 1. In its outer face 8, the inner part 6 includes inner running grooves 7 which are circumferentially distributed in accordance with the outer running grooves 3.

In each case, the opposed outer running grooves 3 and inner running grooves 7 jointly accommodate a torque transmitting ball 9. The balls 9 are guided in windows 10 of a cage 11 so that they are arranged in the angle-bisecting plane through the joint articulation center 13. The angle bisecting plane is the plane which, with the joint in the articulated condition, halves the angle between the longitudinal axis 4 of the outer part and the longitudinal axis 12 of the inner part.

Figure 2:
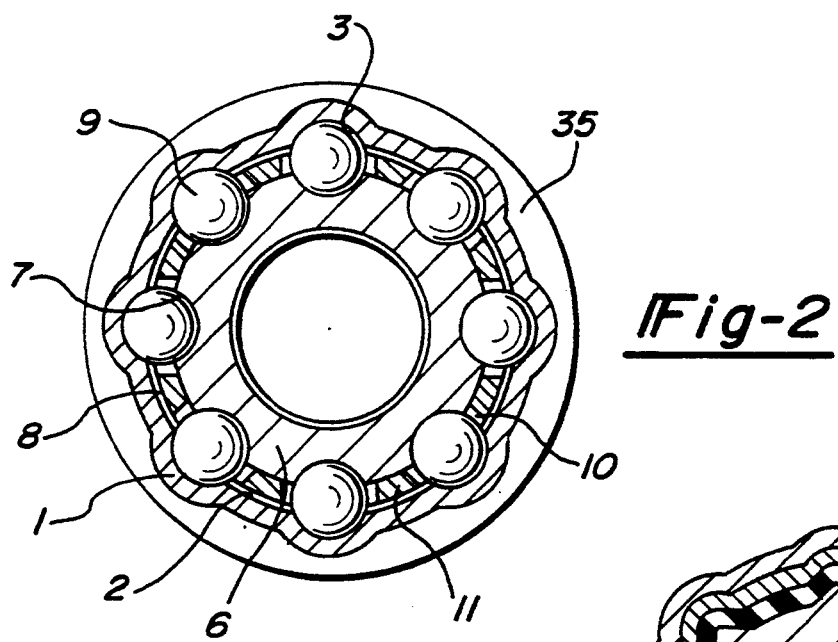
FIG. 2 is a section view of FIG. 1 along line 2—2 thereof.
Figure 3:
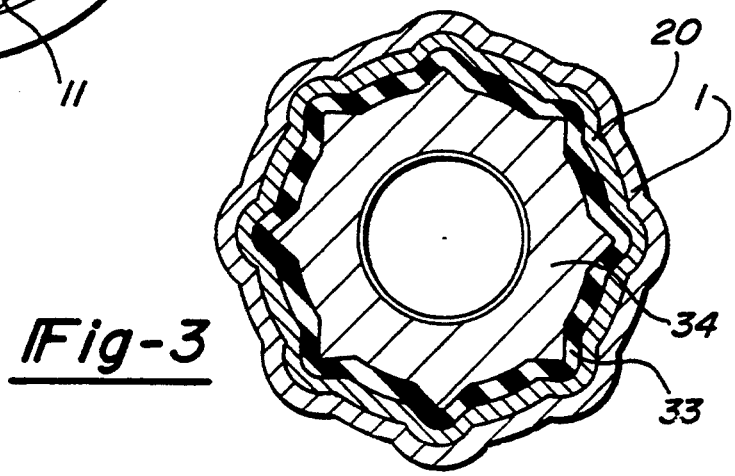
FIG. 3 is a section view of FIG. 1 along line 3—3 thereof.
Figure 4:
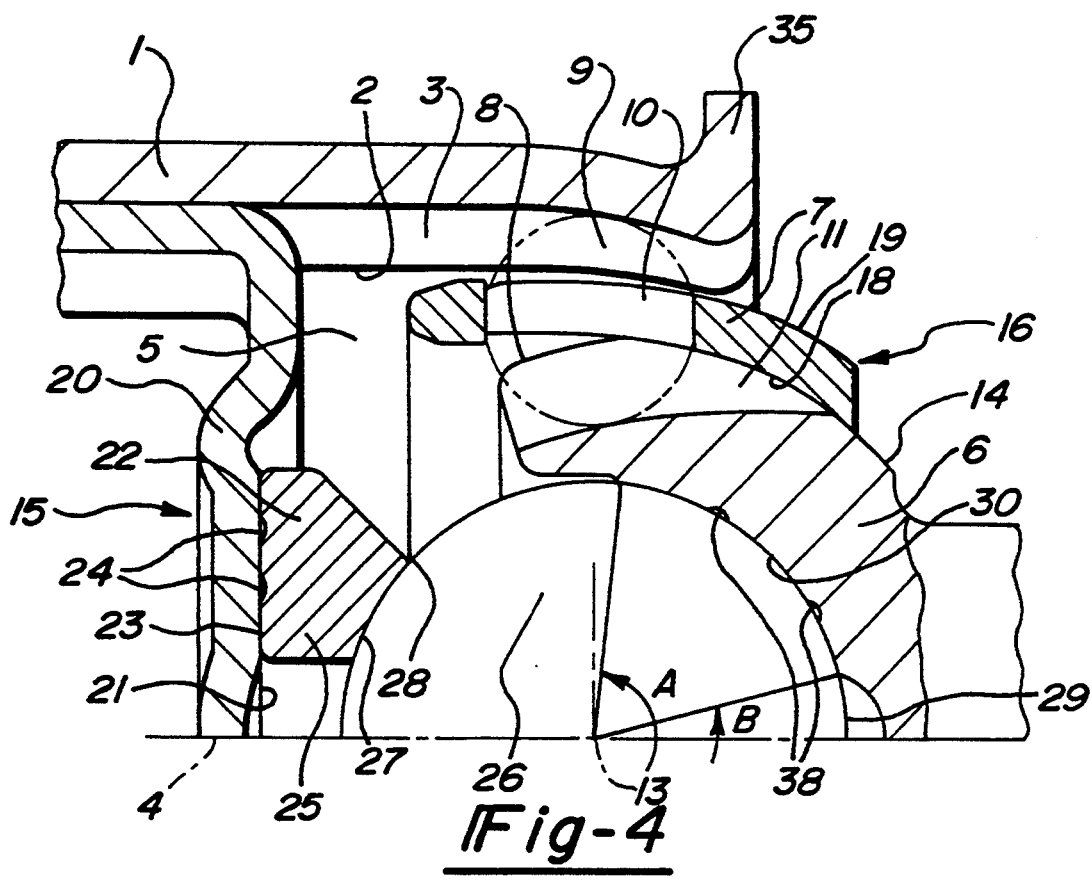
FIG. 4 is an enlarged scale view of a half-section FIG. 1.

On its outer face 8, the inner part 6 has an outer spherical face 14 which faces away from the closed end 15 of the assembled fixed constant velocity joint. Thus, the outer spherical face 14 adjoins the open end 16 of the outer part 1 from which the journal 17 of the inner part projects. The outer spherical face 14 is also centered on the joint articulation center 13. The outer spherical face 14 of the extended joint is positioned approximately in the region of the sectional plane 2 as illustrated in FIGS. 1 and 2. The undercut-free region of the remaining part of the outer face of the inner part 6 is more easily identifiable in the enlarged illustration according to FIG. 4.

The cage 11 is guided via an inner partial spherical face 18 on the outer spherical face 14 of the inner part 6. In the case of this embodiment, play exists between the outer face 19 of the cage 11 and the inner face 2 of the outer part 1. Via its spherical face 18, the cage 11 is held in contact with the outer face 14 of the inner part 6 as a result of the design of the outer running grooves 3 and inner running grooves 7 cooperating with the balls 9. The grooves are designed to be undercut-free and jaw-like starting from the closed end 15 of the joint. Relative to the balls 9, which form a control angle such that in all rotational positions and in all angular positions of the outer part 1 and inner part 6 relative to one another, a force is exerted on the balls 9, under torque transmitting conditions, which holds the balls 9 in contact with the face of the cage windows 10 arranged to face the closed end 15 and thus holds the cage 11 in contact to the outer face 14 of the inner part 6.

As a result, there is substantially no friction relative to the outer part 1 between the cage 11 and the inner face 2 of the outer part. The center of the partial spherical face 18 of the cage 11 is also arranged such that it is positioned at the joint articulation center. The partial spherical face 18 of the cage 11 also ends in front of the angle-bisecting plane. The angle bisecting plane with respect to FIG. 2, is obtained when the joint according to FIG. 1 is in the extended position and halves the angle between the longitudinal axis 12 of the inner part and the longitudinal axis 4 of the outer part.

A supporting element 20 is axially inserted into the cavity 5 of the outer part 1. The supporting element 20 is designed as a formed plate metal part and includes a sliding face 21 extending radially relative to the longitudinal axis 4 of the outer part. The sliding face 21 axially supports the guiding element 22 on its contact face 23 in the direction of the longitudinal axis 4 of the outer part.

To reduce friction when radially displacing the guiding element 22 with its contact face 23 on the sliding face 21, the contact face 23 is provided with lubricating channels 24.

The guiding element 22 is designed in two parts. The guiding element includes a guiding support 25 and a guiding ball 26. The guiding ball 26 is centered and received in the seat face 27 of the guiding support 25 and is firmly connected to the guiding support 25 via a welded region 28. The outer face of the guiding ball 26 forms the second guiding face 29 which is supported on a first guiding face 30 in the hollow interior of the inner part 6. The first guiding face 30 starts from the end of the inner part 6 adjoining the closed end 15 of the joint.

The face 30 is designed as a partial spherical face which forms a kind of hollow spherical zone. The spherical zone is defined by two imaginary sectional planes through the hollow sphere zone of the first guiding face 30 which end in front of a plane transverse to the longitudinal axis and including the joint articulation center 13 such that an apex angle A defined by the imaginary planes intersecting at the joint articulation center 13 is smaller than 166°. This design ensures particularly advantageous friction conditions. The end of the first guiding face 30, positioned away from the closed end 15, ensures a free position relative to the second guiding face 29 when the joint is in the extended position, with the imaginary spherical portion comprising an apex angle B of at least 14°.

The center of the first guiding face 30 is also arranged on the joint articulation center 13. Also, the center of the cooperating second guiding face 29, which is formed by the guiding ball 26, is arranged on the joint articulation center 13. The joint is assembled in such a way that first the cage 11 is slid on to the inner part 6 from the end of the journal 17. Thereafter, the balls 9 are inserted into the windows 10 of the cage 11, and this unit is slid into the outer part 1 from the end facing away from the open end 16 of the outer part 1. Subsequently, the second guiding face 29 of the guiding element 22 is brought into contact with the first guiding face 30 of the inner part 6. The supporting element 20 with its outer contour 31, also from the end facing away from the open end 16, is inserted into the cavity 5 of the outer part 1 until the sliding face 21 comes to rest against the contact face 23 of the guiding element 22 and until the desired play conditions between the outer part 1, cage 11, inner part 6 and the balls 9 have been set. Subsequently, the supporting element 20 is secured to the outer part 1 by the projections of its outer contour 31 engaging the outer running grooves 3 and by weld 32. In the case of the embodiment according to FIGS. 1 to 4, the supporting element 20 serves to provide a connection with a driving or driven component. For this purpose, and for vibration damping reasons, a resilient cushion 33 is inserted into the open end of the supporting element 20. The cushion 33 projects from the outer part in a sleeve-like way, with a hub 34 engaging the cushion 33. The outer and inner contours of the cushion 33 and hub 34 are designed to match the inner contour of the supporting element 20, which is in the form of a formed plate metal part, so that a non-rotating connection is obtained, as seen FIG. 3.

Furthermore, it can be seen that the outer part is provided with an outwardly directed collar 35 which stiffens its end facing the open end 16.

Figure 5:
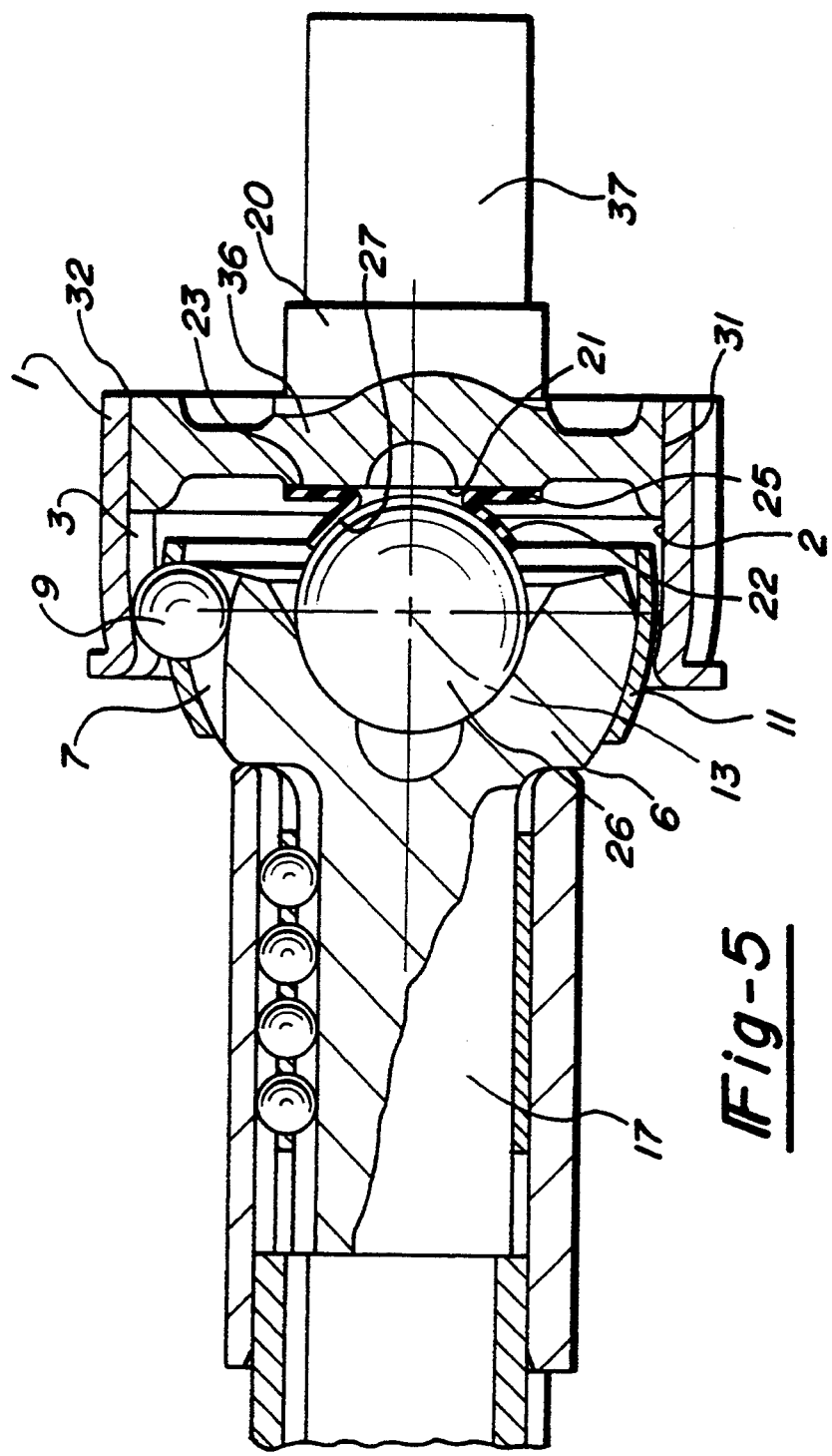
FIG. 5 is a longitudinal section view of a second embodiment with the supporting element as a solid formed part in accordance with the present invention.

The embodiment according to FIG. 5 deviates from FIG. 1 in that the journal 17 of the inner part 6 is simultaneously designed to form part of an axial sliding means. The supporting element 20 is designed as a solid formed part and includes a flange 36 which has an outer contour 31 adapted to the inner face 2 of the outer part 1 and engages the outer running grooves 3. Furthermore, the supporting element 20, designed as a solid formed part, has a formed-on journal 37 to provide a connection with a driving or driven component. As in the case of the embodiments according to FIGS. 1 to 4, the guiding element 20 includes a sliding face 21 for the supporting element 22' which, via its contact face 23, is supported on the sliding face 21.

Figure 6:
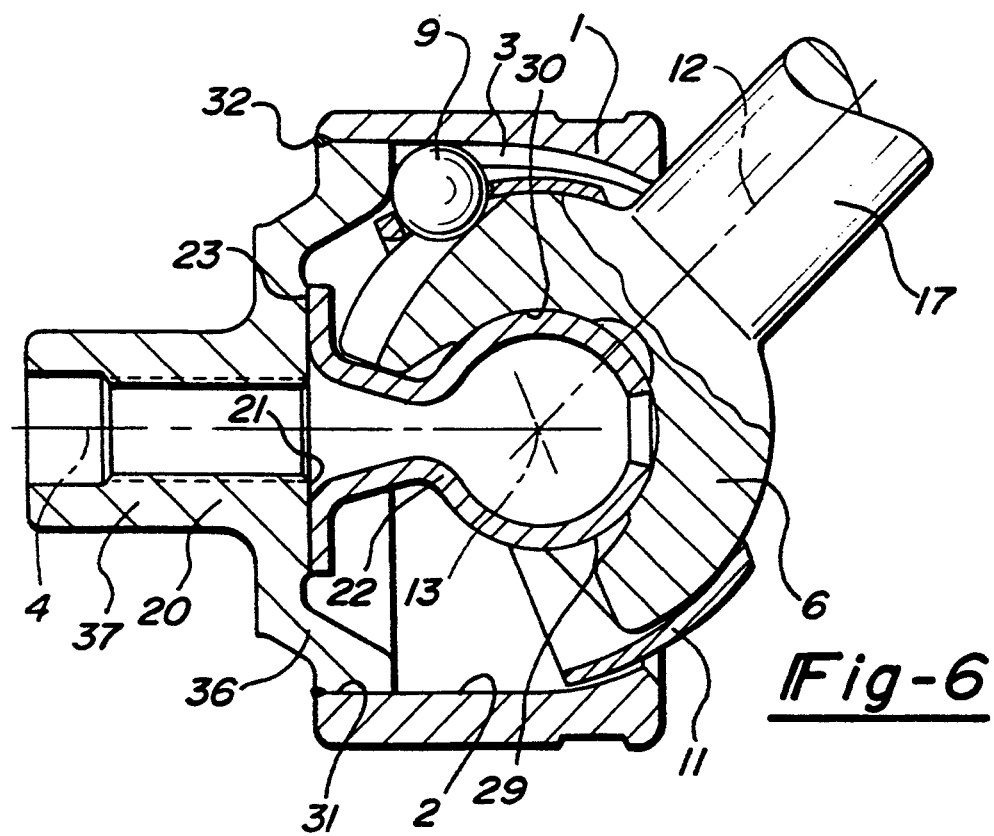
FIG. 6 is a sectional view of a further embodiment, with a solid outer part and a solid supporting element in accordance with the present invention.

Referring to the embodiment according to FIG. 6, the supporting element 20 is in the form of a solid formed part. The element 20 has a flange 36 which, as in the case of the embodiment to FIG. 5, engages the outer running grooves 3 with its outer contour 31. The outer part 1 is also designed as a solid formed part with the supporting element 20 and the outer part 1 connected to one another by a weld 32. As explained in connection with FIG. 5, the supporting element 20 includes a sliding face 21 for the guiding element 22" which, via its contact face 23, rests against the sliding face 21. In contrast to the design according to FIGS. 1 to 5, the guiding element 22" is designed as a formed plate metal part which includes the second guiding face 29 held in contact with the first guiding face 30 of the inner part 6. The cage 11 is arranged and designed as explained in connection with FIG. 1. The inner part 6 is also provided with a journal 12 and shown in an articulated condition relative to the outer part. The supporting element 20 includes a connecting journal 37 to provide a connection with a driving or driven component. The first guiding face 30 is provided with lubricating grooves 38 to reduce friction between the first guiding face 30 and the second guiding face 29.

While the above detailed description describes the preferred embodiment of the present invention, the invention is susceptible to modification, variation, and alteration without deviating from the scope and fair meaning of the subjoined claims.

1. A fixed constant velocity joint comprising:
a hollow outer part with an inner face provided with outer running grooves which extend in meridian planes with reference to a longitudinal axis of the outer part;
an inner part which is arranged in a cavity of the outer part, said inner part having an outer spherical face provided with inner running grooves which extend in meridian planes with reference to a longitudinal axis of the inner part, said inner running grooves being arranged opposite the outer running grooves and said inner part having a concave interior surface defining a first guiding face;
torque transmitting balls in the opposed inner running grooves and outer running grooves, said inner running grooves and outer running grooves being designated to be jaw-like and undercut-free starting from a closed end of the assembled joint;
a cage arranged in the space between the inner face of the outer part and the outer spherical face of the inner part, said cage having windows for guiding said torque transmitting balls, said cage having an inner partial spherical face being guided on the outer spherical face of the inner part facing away from the closed end of the joint;
guiding means for guiding movement between said inner and outer parts including said first guiding face on the inner part and a corresponding second guiding face on a guiding element received therein and supported on a separate supporting element, centers of said guiding faces, together with the center of the outer spherical face, being centered on a joint articulation center, said first guiding face being a partial spherical face which is undercut-free starting from the closed end of the assembled joint, the second guiding face associated with the guiding element forming part of a spherical surface, the centers of the two guiding faces being arranged on the joint articulation center, and the guiding element being supported on the supporting element so as to be axially fixed and radially displaceable with reference to the longitudinal axis of the outer part.

2. The fixed constant velocity joint according to claim 1, wherein said cage includes a partially spherical outer face being guided in the inner face of the outer part.

3. The fixed constant velocity joint according to claim 1, wherein said cage and inner part are centered relative to the outer part via the balls in the inner and outer running grooves and a certain amount of play exists between the outer spherical face of the cage and the inner face of the outer part.

4. The fixed constant velocity joint according to claim 1, wherein lubricating channels are formed in the first guiding face.

5. The fixed constant velocity joint according to claim 1, wherein the outer part is a formed plate metal part.

6. The fixed constant velocity joint according to claim 1, wherein the guiding element is a formed plate metal part.

7. The fixed constant velocity joint according to claim 1, wherein the supporting element is a solid formed part having a flange whose outer contour corresponds to the inner face of the outer part, and a formed-on journal.

8. The fixed constant velocity joint according to claim 1, wherein a supporting element for the outer part, for assembly purposes, is adjustable in the direction of the longitudinal axis of the outer part.

9. The fixed constant velocity joint according to claim 1, wherein the first guiding face forms a hollow spherical zone.

10. The fixed constant velocity joint according to claim 9, wherein two imaginary sectional planes through the hollow sphere zone of the first guiding face which end in front of a plane transverse to the longitudinal axis and including the joint articulation center such that an apex angle (A) defined by the imaginary planes intersecting at the joint articulation center is smaller than 166°.

11. The fixed constant velocity joint according to claim 9, wherein the end of the first guiding face, positioned away from the closed end, ensures a free position relative to the second guiding face when the joint is in the extended position, with the imaginary spherical portion comprising an apex angle of at least 14°.

12. The fixed constant velocity joint according to claim 1, wherein the guiding element is divided and includes a guiding ball and a guiding support, the guiding support has a contact face for enabling support on a sliding face of the supporting element, and a seat face for receiving the guiding ball.

13. The fixed constant velocity joint according to claim 12, wherein lubricating channels are formed in the contact face of the guiding support.

14. The fixed constant velocity joint according to claim 1, wherein the supporting element is a formed plate metal part, and said supporting element is guided in the cavity of the outer part and includes an outer contour which corresponds to the inner face of the outer part.

15. The fixed constant velocity joint according to claim 14, wherein the supporting element is a connecting part connected to a driving or driven part.

* * * * *